Patented June 26, 1928.

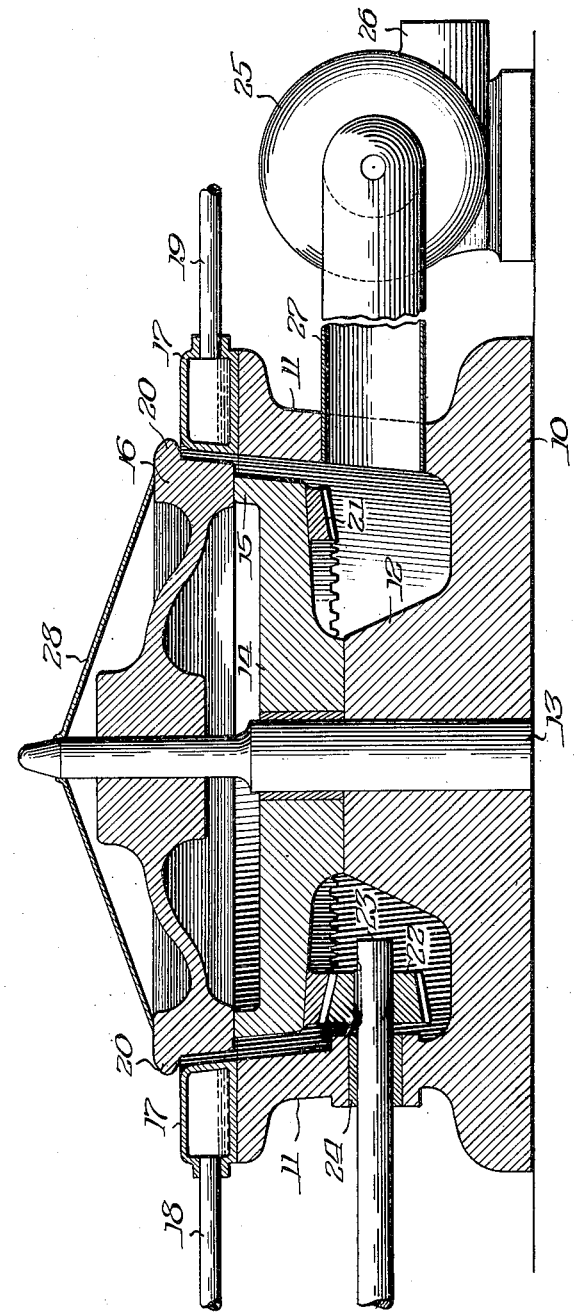

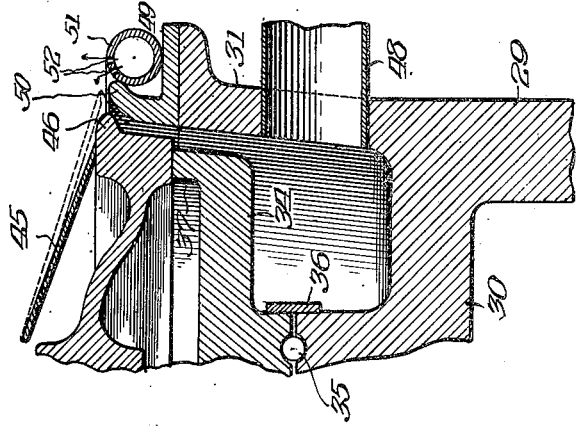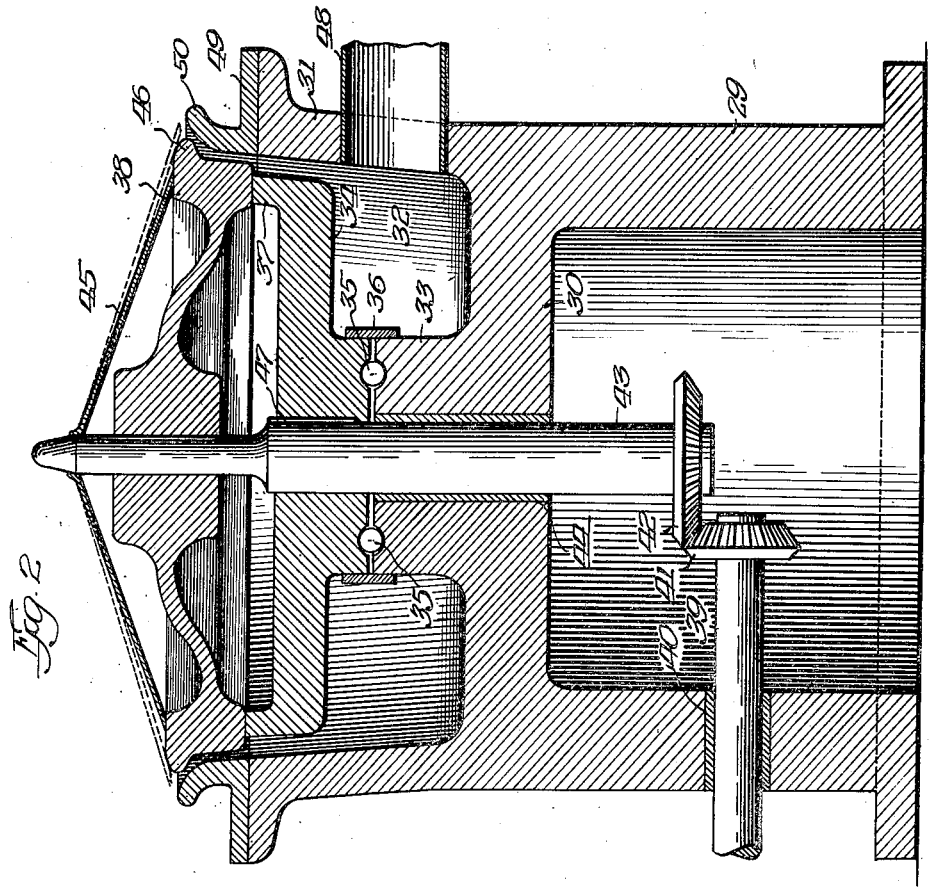

1,674,884

UNITED STATES PATENT OFFICE.

JOHN BRUNNER, OF CHICAGO, ILLINOIS.

APPARATUS FOR COOLING CAR WHEELS.

Application filed April 4, 1925. Serial No. 20,765.

My invention relates to an apparatus for the regulation of cooling of steel forgings and castings, and has particular reference to an apparatus for regulating the cooling of steel wheels for railway equipment.

The primary object of my invention is the provision of an apparatus adapted to regulate the cooling of steel wheels for railway equipment, and particularly the tread portions thereof, and in which the said tread portion of the steel wheel is cooled more rapidly than the plate and hub, thus producing a hardened surface on the tread portions of the steel wheel, and allowing the plate or web and hub to cool more slowly, thus resulting in the production of a steel wheel having a hardened tread surface and having other portions relatively softer and more ductile, and with less initial cooling stresses, thereby enabling the wheels to better withstand the shocks and stresses to which they are subjected in service.

Another and further object of my invention is the provision of a cooling apparatus in which the time of cooling the wheel can be controlled and proportioned to the proper amount required for producing a steel wheel for railway equipment of the proper quality throughout the plate and hub portions, and a hardened tread surface without setting up injurious strains or stresses in the wheels during the cooling operation which would affect their safety in service.

Another object of my invention is the provision of an apparatus by which the cooling of steel wheels for railway equipment can be regulated in a simple and effective operation at a minimum expense.

A further object of my invention is the provision of cooling apparatus for car wheels in which the thickness of the chilled portion of the car wheel can be controlled and in which the chilled portion can be limited to the tread portion of the wheel allowing the flange portion to cool more slowly if desired by controlling the amount of the surface portion of the wheel which is exposed to the atmosphere during the cooling operation.

Another and further object of my invention is the provision of cooling apparatus for car wheels in which the tread portion of the wheel is cooled quickly enough so the tread portion is harder than the wheels now employed and in which the web and hub portions are much softer so the axle boring operation can be more rapidly accomplished.

These and other objects of my invention will be more fully and better understood by reference to the accompanying sheet of drawings, in which Figure 1 is a view partially in elevation and partially in vertical section of the preferred form of my improved invention;

Figure 2 is a vertical sectional view showing a modified form of the apparatus, and Figure 3 is a detailed sectional view showing a form of apparatus which may be employed to cause a spray of steam or water to be injected into the air current entering the space around the tread of the wheel.

Referring now specifically to the drawings, a base member 10 is shown having a circumferentially extending outer wall 11, with an upwardly projecting central portion 12, the base 10 and outer wall 11 forming a bowl-like structure, the base 10 having a stationary spindle 13 centrally mounted thereof, which projects upwards a considerable distance above the projection 12 on the base plate 10. Mounted upon the spindle 13 is a rotatable circular shaped supporting member 14 having a circumferentially upwardly extending flange portion 15, upon which the car wheel is adapted to rest, the outer portion of the wheel being in contact with the flange 15, the said car wheel 16 being mounted upon a spindle 13 and adapted to be rotated with the member 14. The member 14 is slightly less in diameter than the car wheel 16 so that the tread portion of the car wheel extends slightly beyond the edge of the flange 15, thus leaving the tread portion of the wheel exposed to the atmosphere. A hollow cooling ring 17 is provided which is placed upon the upper edge of the outer wall 11 of the base 10 and extends completely around the outer marginal edge of the car wheel, but spaced therefrom, the ring 17 being hollow and adapted to have a cooling fluid circulated therethrough by means of inlet pipes, such as 18, and discharged through outlet pipes 19 either by gravity or any suitable pumping means not shown and which forms no part of my present invention.

The cooling ring 17 is slightly larger in diameter than the car wheel 16 and slightly less in diameter than the car wheel through the flange 20 on the car wheel 16 so that, as shown, the flange portion 20 of the car wheel extends slightly above the cooling ring 17, although it may be found desirable in practice to slightly alter relation of these parts and allow the wheel 16 to extend farther down into the bowl portion of the casting 10 than is shown in the drawing.

The member 14 has a circumferentially extending toothed rack 21 mounted thereon with which a pinion 22 engages, which is mounted upon a shaft 23 extending through the side wall 11 of the base 10, with a bearing 24 in the side wall 11 to keep the shaft 23 in proper alignment. The shaft 23 is connected to a motor or any other suitable rotating means so that the rotation of the shaft causes the member 14 to be rotated by engagement of the pinion 21 with the rack 20, carrying with it the car wheel 16. At one side of the device is mounted a fan 25 having a discharge pipe 26 leading therefrom with a connecting pipe 27 extending through the side wall 11 and into the bowl formed by the casting 10 so that the air is drawn out of the bowl by means of the fan 25 and discharged through the pipe 26. A cover 28 is provided which varies in diameter with relation to the car wheel so that the extent to which the flange portion and tread portion of the wheel is exposed to the atmosphere may be controlled, and which is mounted upon the spindle 13 and revolves with the car wheel 16 and serves to retain the heat in the web and hub portions of the wheel 16 while the tread portion of the car wheel 16 and flange 20 are being cooled by being rotated upon the member 14.

In Figure 2 as illustrated is a modified form of my device and in which a casting 29 is shown hollow at each of its ends and having a web portion 30 intermediate its ends with an upwardly projecting side wall 31, having a space 32 formed therein and having a projecting portion 33 extending upward from the web 30 upon which a rotatable supporting member 34 is mounted with the ball bearings 35, 35, positioned in suitable channels in the base member 33 and bearing surface of the member 34 with a circular retaining strip 36 adapted to keep dirt from entering the space between the members 34 and projection 33. The member 34 has a peripheral extending flange 37 on the upper portion thereof with a car wheel 38 positioned thereon in the same manner as has been heretofore described. Extending in the base portion of the casting 29 is a shaft 39, the shaft having a bearing 40 therearound, the shaft having a gear wheel 41 mounted on the inner end thereof which meshes with the second gear 42 mounted upon the lower end of a rotatable shaft 43, which extends upwardly through the member 29 and centrally through the projection 33 with a bearing 44 positioned therein, the shaft 43 extending upwardly through the car wheel 38 which it serves to hold in position during the cooling operation. A cover 45 which, it will be noted, is shown in full lines of substantially the same diameter as the supporting member 34 and shown in dotted lines extending beyond the flange 46 of the car wheel 38 so that the entire upper surface of the car wheel is protected from the atmosphere by the cover 45. The member 34 is secured to the shaft 43 by means of a key 47 so that as the shaft 39 is rotated by means of a motor or any suitable power device, the member 37 is rotated carrying with it the car wheel 38 and cover 45. An air discharge pipe 48 is shown extending through the side wall 31 and through which air is exhausted by means of the manner illustrated in Figure 1. Mounted on the upper edge of the wall 31 and extending circumferentially thereof is a member 49 having an upwardly projecting outwardly curved circular extending flange 50 which extends upwardly a distance substantially equal to the thickness of the car wheel and the flange 50 forming a guiding member for the air induced by the fan 25. As the hot air is withdrawn from the bowl formed by the walls 31, it will be noted that the flange 50 is curved in such manner that the current of air is directed against the wearing portion of the flange 46 and the tread portion of the wheel 38 so that these portions of the wheel are cooled quickly and chilled so that they are hardened while the hub and web portion of the wheel are protected from the cooling influence of the atmosphere and the heat retained in these portions of the car wheel.

In Figure 3 is shown a detail of the parts shown in Figure 2 and in which a pipe 51 is provided which extends circumferentially around the device adjacent the flange 50, the said pipe having a plurality of openings 52 in the upper portion thereof, and being connected to any suitable source of steam or water supply, or other cooling fluid or gas, and which is allowed to escape through the holes 52 which extend completely around the flange 50 so that small quantities of steam or other cooling fluid is injected into the cooling air drawn in around the tread portion of the wheel, thus serving to more effectively and more quickly chill or cool the tread portions of the wheel.

In operation, the device is exceedingly simple, the car wheel 16 being placed upon the spindle 13, the side of the tread portion of the car wheel resting upon the flange 15 of the member 14, the top of which is substantially even with the upper edge of the wall 11. The cover 28 is placed over the car wheel and the supporting member 14 and wheel 16 is thereupon rotated through the means of the shaft 22 and pinion 21, the fan 25 being operated so that the hot air is drawn out of the bowl and the air passing in between the cooling ring 17 and the tread of the car wheel 16 cools the tread of the car wheel rapidly. The web and hub portions thereof are protected from the air by the supporting member 14 on the lower side and the cover 25 upon the upper side. The extent of protection furnished the surface portions of the wheel may be varied, as shown in Figure 2, by using covers of greater or less diameter than the car wheel, as desired. If desired, and to further assist in the chilling of the wheel, a cooling fluid may be kept in circulation through the cooling ring 17, through the inlet pipes 18 and outlet pipes 19 so that the air entering along the tread portion of the car wheel is reduced in temperature below the normal atmospheric temperature of the air, thus materially increasing the rapidity of the cooling of the tread portion of the car wheel. After this operation is carried out to a sufficient degree the wheel is removed from the device and allowed to cool in a natural manner, thereby retaining the web and hub portion of the wheel in a soft and workable condition.

The device illustrated in Figures 2 and 3 operates in the same general manner as the apparatus illustrated in Figure 1 with the exception that the power is applied through the shaft 39, gear wheels 41 and 42 to the shaft 43 and the member 34 rotated after the car wheel 38 is placed upon the supporting member 34 and the cover 45 is placed in position so that the wheel is rapidly revolved coming in contact with the atmosphere which rapidly cools the tread portion of the wheel, the hot air being kept constantly withdrawn by the fan 25 until the wheels have cooled to the degree desired when the cover 45 is removed and the car wheel 38 also removed from the apparatus and allowed to cool naturally so that the hub and web portions of the wheel are not chilled, but are protected by the cover 45 from the atmosphere while the chilling or cooling of the tread portion of the wheel takes place. If it is desired, as illustrated in Figure 3, a cooling fluid may be injected directly into the air entering along the marginal edge of the wheel tread so as to assist in a more rapid cooling of this portion of the car wheel.

It will be understood, of course, that the car wheel has been heated to the temperature desired before being placed upon the device and that after the tread portion is cooled in the manner heretofore described that the wheel can then be allowed to cool naturally and slowly so that no injurious stresses or strains are set up in the various portions of the wheel. It will also be understood that the hole in the hub as shown in the drawing is slightly less in diameter than that used to fit the axle and that after the wheels have passed the thermal treatment the hole in the hub is bored to the proper diameter to fit upon the axle.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. Car wheel cooling apparatus comprising in combination a bowl-shaped member, a spindle centrally mounted on said support member, a rotatable support member mounted upon the said spindle, means for revolving rotatable member, and an exhaust pipe connected to said bowl shaped member whereby the air is withdrawn therefrom and a current of inflowing air induced around the tread of the car wheel.

2. Car wheel cooling apparatus comprising in combination a bowl-shaped member, a spindle centrally mounted on said support member, a rotatable support member mounted upon the said spindle, means for revolving the rotatable member, air exhaust means connected to said bowl whereby the air is withdrawn therefrom and a current of inflowing air induced into said bowl around the tread of the car wheel, and a cooling ring mounted upon the outer marginal edge of said bowl-shaped member.

3. Car wheel cooling apparatus comprising in combination a bowl-shaped member, a spindle centrally mounted on said support member, a rotatable support member mounted upon the said spindle, means for revolving the rotatable member, an exhaust fan connected to said bowl whereby the hot air is withdrawn and a current of inflowing air is induced around the tread of the car wheel, a hollow cooling ring mounted upon the outer marginal edge of said bowl member, and means for causing a fluid to circulate within said cooling ring.

4. Car wheel cooling apparatus comprising in combination a bowl-shaped member, a spindle centrally mounted on said support member, a rotatable support member mounted upon the said spindle, means for revolving the rotatable member, a cover for said car wheel, an exhaust fan connected to said bowl whereby the air is withdrawn therefrom and a current of inflowing air induced around the tread of the car wheel, a hollow cooling ring mounted upon the outer marginal edge of said bowl member, and means for causing a fluid to circulate within said cooling ring.

5. Car wheels cooling apparatus comprising in combination a bowl-shaped member, a spindle centrally mounted on said support member, a rotatable support member mounted upon the said spindle, means for revolving the rotatable member, a cover for said car wheel, the said cover and said supporting member being lesser in diameter than the car wheel, an exhaust fan connected to said bowl whereby the air is withdrawn therefrom and a current of inflowing air induced around the tread of the car wheel, a hollow cooling ring mounted upon the outer marginal edge of said bowl member, and means for causing a fluid to circulate within said cooling ring.

6. Car wheel cooling apparatus comprising in combination a bowl shaped member, a car wheel supporting member mounted therein, a cover for said car wheel, and means whereby the hot air is exhausted from said bowl member and a current of air induced to enter said bowl member around the tread portions of the car wheel.

7. Car wheel cooling apparatus comprising in combination a bowl-shaped member, a car wheel supporting member mounted therein, means whereby a current of air is induced between the marginal edge of the car wheel and the edge of the bowl-shaped member, the said air induction means also carrying the heated air away from the car wheel, and means for injecting a spray of cooling fluid into the air induced around the edge of the car wheel.

8. Car wheel cooling apparatus comprising in combination a bowl-shaped member, a car wheel supporting member mounted therein, means whereby a current of air is induced between the marginal edge of the car wheel and the edge of the bowl-shaped member, the said air induction means also carrying the heated air away from the car wheel, and means for spraying a cooling liquid into the current of air induced around the marginal edge of the car wheel.

Signed at Chicago, Illinois, this 24th day of March, 1925.

JOHN BRUNNER.